US010087266B2

(12) United States Patent
Haberkorn et al.

(10) Patent No.: US 10,087,266 B2
(45) Date of Patent: *Oct. 2, 2018

(54) EPOXY-TERMINATED POLYBUTADIENE AS OXYGEN SCAVENGER

(71) Applicant: EVONIK DEGUSSA GMBH, Essen (DE)

(72) Inventors: Niko Haberkorn, Dorsten (DE); Peter Denkinger, Nottuln (DE); Stefan Nordhoff, Recklinghausen (DE); Uwe Numrich, Gross-Zimmern (DE)

(73) Assignee: Evonik Degussa GmbH, Essen (DE)

( * ) Notice: Subject to any disclaimer, the term of this patent is extended or adjusted under 35 U.S.C. 154(b) by 40 days.

This patent is subject to a terminal disclaimer.

(21) Appl. No.: 15/102,710

(22) PCT Filed: Dec. 3, 2014

(86) PCT No.: PCT/EP2014/076377
§ 371 (c)(1),
(2) Date: Jun. 8, 2016

(87) PCT Pub. No.: WO2015/086391
PCT Pub. Date: Jun. 18, 2015

(65) Prior Publication Data
US 2016/0311949 A1    Oct. 27, 2016

(30) Foreign Application Priority Data
Dec. 12, 2013 (DE) .......................... 10 2013 225 703

(51) Int. Cl.
| | | |
|---|---|---|
| C08F 136/06 | (2006.01) |
| B32B 27/08 | (2006.01) |
| B32B 27/30 | (2006.01) |
| B32B 27/32 | (2006.01) |
| C08C 19/38 | (2006.01) |
| B32B 27/34 | (2006.01) |
| B32B 27/36 | (2006.01) |
| B65D 65/38 | (2006.01) |
| B65D 81/26 | (2006.01) |
| C08J 5/18 | (2006.01) |
| C08L 67/02 | (2006.01) |
| C08L 77/02 | (2006.01) |
| C09D 147/00 | (2006.01) |

(52) U.S. Cl.
CPC ............ C08F 136/06 (2013.01); B32B 27/08 (2013.01); B32B 27/304 (2013.01); B32B 27/306 (2013.01); B32B 27/32 (2013.01); B32B 27/34 (2013.01); B32B 27/36 (2013.01); B65D 65/38 (2013.01); B65D 81/266 (2013.01); C08C 19/38 (2013.01); C08J 5/18 (2013.01); C08L 67/02 (2013.01); C08L 77/02 (2013.01); C09D 147/00 (2013.01); B32B 2250/24 (2013.01); B32B 2307/7244 (2013.01); B32B 2307/74 (2013.01); B32B 2439/00 (2013.01); C08J 2367/02 (2013.01); C08J 2377/02 (2013.01); C08J 2447/00 (2013.01)

(58) Field of Classification Search
CPC ....................................................... C08F 36/06
See application file for complete search history.

(56) References Cited

U.S. PATENT DOCUMENTS

| | | | |
|---|---|---|---|
| 3,055,952 A * | 9/1962 | Goldberg ................ C08C 19/38 260/665 R |
| 5,089,323 A | 2/1992 | Nakae et al. |
| 5,116,660 A | 5/1992 | Komatsu et al. |
| 5,143,769 A | 9/1992 | Moriya et al. |
| 5,153,038 A | 10/1992 | Koyama et al. |
| 5,350,622 A | 9/1994 | Speer et al. |
| 5,399,289 A * | 3/1995 | Speer ......................... C08J 5/18 252/188.28 |
| 5,420,312 A * | 5/1995 | Andrews .............. C07D 303/22 523/400 |
| 5,529,833 A | 6/1996 | Speer et al. |
| 5,789,512 A | 8/1998 | Fan et al. |
| 6,083,585 A * | 7/2000 | Cahill ..................... B32B 27/36 428/35.7 |
| 7,495,129 B2 | 2/2009 | Balduf et al. |
| 7,557,245 B2 | 7/2009 | Nordhoff et al. |
| 7,557,246 B2 | 7/2009 | Nordhoff et al. |
| 7,803,969 B2 | 9/2010 | Nordhoff et al. |
| 7,964,689 B2 | 6/2011 | Nordhoff et al. |
| 8,252,120 B2 | 8/2012 | Nordhoff et al. |
| 2004/0043327 A1 | 3/2004 | Sugano et al. |
| 2008/0011966 A1 | 1/2008 | Schaefer et al. |

(Continued)

FOREIGN PATENT DOCUMENTS

| | | |
|---|---|---|
| JP | 2001031768 A | 2/2001 |
| RU | 2483931 C2 | 1/2009 |

(Continued)

OTHER PUBLICATIONS

English language International Search Report dated Apr. 20, 2015 in PCT/EP2014/076377 (3 pages).
German Language International Search Report dated Apr. 20, 2015 in PCT/EP2014/076377 (4 pages).
German language Written Opinion dated Apr. 20, 2015 in PCT/EP2014/076377 (5 pages).
Nagao, Yuji et al., "Graft polymers with good oxygen-barrier property, their manufacture, and compositions thereof," copyright Feb. 2001, Chemical Abstracts Service, Columbus, OH, US (2 pages).

Primary Examiner — Kuo Liang Peng
(74) Attorney, Agent, or Firm — Nexsen Pruet, LLC; Philip P. McCann

(57) ABSTRACT

The present invention relates to the use of epoxy-terminated polydiene having terminal epoxy groups as oxygen scavenger, in particular as constituent in packaging.

15 Claims, No Drawings

(56) References Cited

U.S. PATENT DOCUMENTS

| | | | |
|---|---|---|---|
| 2010/0279048 A1* | 11/2010 | Stewart | ............... C09K 15/06 428/36.92 |
| 2013/0178923 A1 | 7/2013 | Dabrowiak | |
| 2013/0338324 A1 | 12/2013 | Beierlein et al. | |
| 2015/0307640 A1* | 10/2015 | Berlineanu | ............ C08C 19/06 525/122 |

FOREIGN PATENT DOCUMENTS

| | | |
|---|---|---|
| WO | 1998012244 A1 | 3/1998 |
| WO | 2013177266 A1 | 11/2013 |

\* cited by examiner

EPOXY-TERMINATED POLYBUTADIENE AS OXYGEN SCAVENGER

This application is a national stage application under 35 U.S.C. § 371 of International Application No. PCT/EP2014/076377 filed 3 Dec. 2014, which claims priority to German Application No. DE 10 2013 225 703.1 filed 12 Dec. 2013, the disclosures of which are expressly incorporated herein by reference.

FIELD

The present invention relates to the use of polybutadiene having terminal epoxy groups as oxygen scavenger, in particular as constituent in composite materials for packaging applications.

BACKGROUND

Composite materials are packaging materials composed of at least two different materials bonded to one another over an entire area and not amenable to manual separation. They are a subgroup of the layer laminates and therefore of the laminates in general. Packaging produced therefrom is called composite-material packaging or composite packaging.

The drinks carton is typical composite packaging. It is composed of paper board and of polyethylene plastic, and for products with long shelf lives, such as juices, it can also comprise a layer of aluminum. Butter wrapping (aluminum/paper), plastics-coated cartons for deep-frozen foods, and pouches for instant soups (aluminum/plastic) are other commonly used types of packaging made of composite materials.

Restriction of contact between oxygen and oxygen-sensitive products conserves and improves the quality of many products and the storage times of the same. By way of example, restriction of contact between oxygen and oxygen-sensitive food products in a packaging system can conserve the quality of the food product and delay spoiling. This type of packaging also increases the time for which the product can be kept in stock, thus reducing the costs incurred through waste and restocking.

The food-and-drink industry has developed some techniques for restricting contact with oxygen. Conventional techniques include those where certain means which differ from the packaged item and from the packaging material are used to consume oxygen within the environment of the packaging (an example being use of small pouches of oxygen-scavenging material), those which create reduced-oxygen-content environments within the packaging (examples being packing under modified atmosphere and vacuum packing), and those that prevent ingress of oxygen into the packaging environment (examples being barrier films). Combinations of the techniques mentioned are moreover very frequently used. In the case of the barrier films, a distinction has to be made between films composed of an oxygen-impermeable material (passive barrier property) and films comprising a material which binds the oxygen chemically or physically (active barrier properties). Systems with combined active and passive barrier action, with single- and multilayer structures, are frequently used.

By way of example, oxygen-scavenging materials have been incorporated directly into the structure of the packaging. This technique (hereinafter termed "active oxygen barrier") can provide a uniform scavenging effect within the entire packaging, and a means of intercepting and trapping oxygen that passes through the walls of the packaging. Active oxygen barriers have been formed through incorporation of inorganic powders and/or salts as part of the packaging, and described by way of example in U.S. Pat. Nos. 5,153,038, 5,116,660, 5,143,769 or 5,089,323. However, the incorporation of powders and/or salts of this type can impair the transparency and the mechanical properties of the packaging material, and can complicate processing, in particular where thin films are required. Furthermore, these compounds, and oxidation products thereof, can be absorbed by the food in the container, and within the food product this can lead to non-compliance with national standards for human consumption.

Oxygen-scavenging compositions comprising transition metal catalysts and ethylenically unsaturated hydrocarbon polymers are disclosed in U.S. Pat. No. 5,399,289. The polymers described in that document are amorphous, and they can therefore be difficult to mix and to process with film-forming semicrystalline polymers which are conventionally used to provide flexibility to packaging materials.

WO 1998012244A1 describes, for use as oxygen-removing materials, polycondensation copolymers composed mainly of polyester segments and of polyolefin segments based on 1,3 butadiene. However, the incorporation of the oxygen-scavenging polybutadiene segments here is restricted to a PET matrix, and cannot be extended to other polymer matrices.

A polymeric material for use in an oxygen-scavenging composition should ideally exhibit good processing properties, be amenable to direct formation within the ready-to-use packaging materials, or have high compatibility with the polymers that are usually used to produce packaging materials. The appropriate materials should moreover produce no by-products that impair the color, taste or odor of the packaged product. Migration of monomers or oligomers from the single—or multilayer film into the interior of the packaging container should therefore as far as possible be prevented. A packaging material formed from a composition of this type is ideally capable of retaining its physical properties after scavenging a suitable quantity of oxygen.

The present invention achieves the abovementioned complex technical object. Accordingly, the present invention firstly provides the use of polydiene having terminal epoxy groups as oxygen scavenger.

SUMMARY

The use of a polydiene having terminal epoxy groups as oxygen scavenger has the advantage according to the invention of achieving adequately high activity as oxygen scavenger, combined with low toxicity of the polydienes, because there is no possibility of release and migration of any monomers or oligomers. This is particularly true when, as is preferable, by virtue of the epoxy modification all of the oligomers undergo reactive incorporation into the polymer matrix. The polydienes mentioned moreover exhibit good compatibility with other components of coating compositions. The low viscosity and glass transition temperature of the appropriate polydienes can provide good processability, and moreover the possibility of reactive incorporation into multilayer systems.

The terminal epoxy groups permit universal reactive incorporation into diverse polymer matrices used as oxygen barrier for the production of packaging. Particular matrix polymers that may be mentioned, permitting reactive incorporation by means of the epoxy groups of the polydiene, are ethylene/vinyl alcohol copolymers (EVOH), polyethylene terephthalate (PET), polyamides and polylactides. In contrast to this, when a polydiene having hydroxy groups is used, the only possibility is reactive incorporation of this into a PET matrix (see WO 1998012244A1).

DETAILED DESCRIPTION

The polydiene used according to the invention is preferably polybutadiene having terminal epoxy groups, where the polybutadiene comprises the 1,3-butadiene-derived monomer units

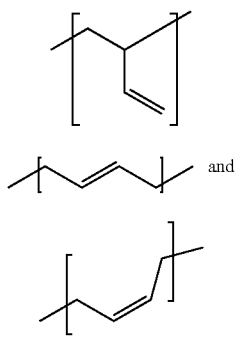

(A)

(B) and (C)

where the proportion of A in the entirety of the 1,3-butadiene-derived monomer units present in the polybutadiene is from 10 to 60 mol percent, and where the sum of the proportions of B and C in the entirety of the 1,3-butadiene-derived monomer units present in the polybutadiene is from 40 to 90 mol percent, where the epoxy groups have the formula (I)

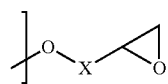

(I)

and X is a linear or branched alkylene group, preferably a linear alkylene group of the formula —$(CH_2)_x$—, where x is from 1 to 4, more preferably 1.

The abovementioned preferred polybutadiene having epoxy groups is produced by free-radical polymerization of 1,3-butadiene and, produced therefrom, polybutadiene having epoxy groups, in each case comprising the 1,3-butadiene-derived monomer units A), B) and C) present in the polybutadiene, where a square bracket in the formula representation selected in this application for the 1,3-butadiene-derived monomer units A), B) and C) present in the polybutadiene indicates that the bond at the respective square bracket is not terminated by way of example by a methyl group, and that, instead, the corresponding monomer unit is bonded by way of this bond to another monomer unit or another functional group, in particular a hydroxy group or epoxy group. The arrangement here can have the monomer units A), B) and C) in any desired sequence in the polymer. A random arrangement is preferred.

In one preferred embodiment, the proportion of A, B and C in the entirety of the 1,3-butadiene-derived monomer units present in the polybutadiene is in each case and mutually independently at least 10 mol percent.

It is particularly preferable that the proportion of A in the entirety of the 1,3-butadiene-derived monomer units present in the polybutadiene is from 15 to 30 mol percent, the proportion of B in the entirety of the 1,3-butadiene-derived monomer units present in the polybutadiene is from 50 to 70 mol percent and the proportion of C in the entirety of the 1,3-butadiene-derived monomer units present in the polybutadiene is from 15 to 30 mol percent.

In one preferred embodiment, there can also be other monomer units present alongside the 1,3-butadiene-derived monomer units A), B) and C) present in the polybutadiene, in particular monomer units not derived from 1,3-butadiene. In a most preferred embodiment, however, the entirety of the 1,3 butadiene-derived monomer units A), B) and C) present in the polybutadiene represents a proportion of at least 80 mol percent, preferably 90 mol percent, more preferably 95 mol percent, most preferably 100 mol percent, of the entirety of the monomer units, comprising the 1,3-butadiene-derived units and other units, incorporated into the polymer.

In one preferred embodiment, the polybutadiene used according to the invention having epoxy groups has an average functionality of from 1.5 to 3, preferably from 1.75 to 2.5. This means that a polybutadiene molecule, irrespective of its length, has on average from 1.5 to 3 epoxy groups, preferably from 1.75 to 2.5.

The polybutadienes used according to the invention having terminal epoxy groups are in particular produced by a process comprising the following steps:
  a) provision of a polybutadiene produced by means of free-radical polymerization and having hydroxy groups,
  b) reaction of the polybutadiene having hydroxy groups from step a) with a monoepoxy compound in a reaction mixture,
where the molar ratio of terminal hydroxy groups to the monoepoxy compound is from 10:1 to 1:10, where the temperature is from 0 to 150° C., and where the reaction time is from 0.5 to 24 hours,
  c) addition of an alkali metal hydroxide, alkali metal hydrogencarbonate or alkali metal carbonate to the reaction mixture from step b),
where the polybutadiene having terminal hydroxy groups comprises the 1,3-butadiene-derived monomer units

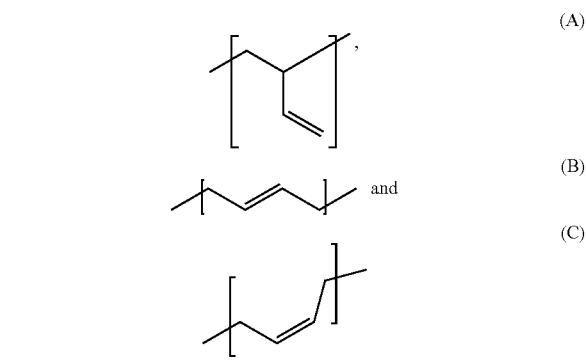

(A)

(B) and (C)

where the proportion of A in the entirety of the 1,3-butadiene-derived monomer units present in the polybutadiene is from 10 to 60 mol percent, and where the sum of the proportions of B and C in the entirety of the 1,3-butadiene-derived monomer units present in the polybutadiene is from 40 to 90 mol percent, where the proportion of A, B and C in the entirety of the 1,3-butadiene-derived monomer units present in the polybutadiene is preferably in each case mutually independently at least 10% where it is still more preferable that the proportion of A in the entirety of the 1,3 butadiene-derived monomer units present in the polybutadiene is from 10 to 30 mol percent, the proportion of B in the entirety of the 1,3-butadiene-derived monomers units present in the polybutadiene is from 50 to 70 mol percent and the proportion of C in the entirety of the 1,3-butadiene-derived monomer units present in the polybutadiene is from 15 to 30 mol percent.

The process of the invention requires, as step a), the provision of a polybutadiene which has been produced by means of free-radical polymerization and which has hydroxy groups. A polybutadiene of this type having hydroxy groups can by way of example be produced by polymerization of 1,3-butadiene in the presence of hydrogen peroxide, water and an organic solvent, as described in EP12169794.0. In one preferred embodiment, the term "polybutadiene" as used herein means a product obtained by polymerization of monomer units having in each case at least two conjugated double bonds, where the proportion of monomer units that are 1,3-butadiene is, in order of increasing preference, at least 80, 85, 90, 95, 98, 99 or 99.9%.

In step b) of the process according to the invention, the polybutadiene having hydroxy groups is reacted with a monoepoxy compound in the presence of inert gas. The monoepoxy compound is in particular selected from the group comprising epihalohydrins, preferably epichlorohydrin, β-methylepichlorohydrin or epibromohydrin, and alkylene oxides, preferably ethylene oxide, propylene 1,2-oxide and butylene 1,2-oxide. The molar ratio of the monoepoxy compound to terminal hydroxy groups in the reaction mixture in step b) is preferably from 0.5 to 2:1, with preference from 0.9 to 1.2:1.

It is preferable to use a quantity of from 0.5 to 2 mol of epichlorohydrin per equivalent of a polybutadiene-bonded hydroxy group. It is particularly preferable to use a quantity of 0.9 to 1.2 mol of epichlorohydrin per equivalent of a polybutadiene-bonded hydroxy group.

The step b) of the abovementioned process can proceed in the presence of a solvent, where the solvent is preferably selected from the group comprising the room-temperature-liquid aliphatics, aromatics, esters and ethers. In one preferred embodiment, the solvent is a room-temperature-liquid aliphatic, for example hexane, heptane, octane, cyclohexane, a room-temperature-(25° C)-liquid aromatic, for example benzene, toluene, a room-temperature-liquid ester, for example ethyl acetate, butyl acetate, or a room-temperature-liquid ether, for example diethyl ether or diisopropyl ether, dioxane or tetrahydrofuran. The nature and amount of the solvent depends on the polybutadiene used having hydroxy groups and on the amount of the monoepoxy compound. Solvent mixtures of the solvents mentioned are possible in any desired quantitative ratios. The proportion of the entirety of polybutadiene having hydroxy groups and monoepoxy compound in the reaction mixture can in each case be from 5 to 80 percent by weight.

It is moreover possible that step b) proceeds in the presence of at least one metal salt or semimetal salt which comprises at least one metal cation or semimetal cation, preferably selected from the group consisting of boron, aluminum, zinc and tin and at least one anion selected from the group consisting of $F^-$, $Cl^-$, $BF_4^-$, $PF_6^-$, $AsF_6^-$, $SbF_6^-$, $ClO_4^-$, $IO_4^-$ and $NO_3^-$. The quantity used of the catalyst is preferably from 0.001 to 0.5 mol of the metal salt per equivalent of a polybutadiene-bonded hydroxy group. The reactants and the catalyst can be used as initial charge and then reacted. It is preferable that the metal salt catalyst is used with the polybutadiene having hydroxy groups as initial charge and that the monoepoxy compound, preferably epihalohydrin, is then added.

It is moreover preferable to carry out step b) in the presence of a solvent, and to remove this from the reaction mixture before, during or after step c), preferably after step c).

It is further preferable that step b) takes place in the presence of inert gas at reduced or elevated pressure. In one preferred embodiment, the expression "inert gas" as used herein means a gas or gas mixture, the entirety of which is inert. It is preferable that the inert gas is nitrogen, noble gases or a mixture thereof.

It is preferable that the duration of step b) is from 0.5 to 24 hours. The temperature in step b) is from 0 to 150° C., preferably from 0 to 70° C.

Either the polybutadiene having hydroxy groups or the monoepoxy compound can be used as initial charge when the reaction in step b) is started. As an alternative, it is also possible to use both compounds together as initial charge. The reaction mixture is then brought to the reaction temperature by heating.

In another embodiment according to the invention, excess monoepoxy compound can be removed by distillation after step b) and before step c). It is preferable that excess monoepoxy compound is removed by distillation after step b), and it is preferable that the solvent is added only after said removal of the excess monoepoxy compound.

In step c) dehydrohalogenation is achieved through addition of at least one alkali metal hydroxide as base to the reaction mixture from step b), in order to form the alkali metal halide. In step c) of the abovementioned process it is preferable to add from 0.7 to 1.4 mol of alkali metal hydroxide, alkali metal hydrogencarbonate or alkali metal carbonate for every mole of terminal hydroxy groups in step a). The temperature in step c) should be from 0 to 80° C.

The polydienes, in particular polybutadienes, produced by the abovementioned process, having terminal epoxy groups are particularly suitable for the use according to the invention as oxygen scavengers.

The use according to the invention in particular involves coatings comprising polydiene having terminal epoxy groups.

The present invention further provides composite materials for packaging applications at least comprising a polydiene having terminal epoxy groups. In one preferred embodiment, the composite materials according to the invention are composed of at least two layers, preferably made of materials that differ from one another.

The composite materials according to the invention can be used in any of the forms of composite-material packaging known to the person skilled in the art, for example as flexible film layers, flexible pouches, self-supporting containers or combinations thereof. Typical flexible films and pouches include those used for the packing of various foods, and can be formed from one or a plurality of layers, in order to form the entire film- or pouch-type packaging material. The polydienes used according to the invention having terminal epoxy groups can be used in one, some or all of the layers of the composite materials. The thickness of materials in the form of flexible films and pouches is normally in the range from 5 to 260 micrometers.

Typical self-supporting or semi-self-supporting containers include containers made of plastic, paper or paper board, for example those used for juices and soft drinks, and also thermoformed trays or dishes, the wall thickness of these normally being in the range from 100 to 1000 micrometers.

The polydienes used according to the invention having terminal epoxy groups can be used as integral layer or as coating of the molded semi-self-supporting or self-supporting packaging article.

Although from the point of view of convenience during the packing process and/or of effective scavenging it may be preferable to use the present invention as integral part of the wall of the packaging, it is also possible to use the invention as non-integral component of said packaging article, for example as bottle closure lining, adhesive or non-adhesive layer-type insert, sealing material, sachet or fiber mat insert.

The present invention likewise provides composite-material packaging at least comprising a polydiene having terminal epoxy groups.

The present invention can provide advantages not only to packaging articles that can be used for food and drink but also to packaging of articles which are other oxygen-sensitive products. Among said products are pharmaceutical products and oxygen-sensitive medical products, products or metals susceptible to corrosion, and also electronic devices.

The polydienes used according to the invention having terminal epoxy groups can easily be processed by conventional techniques. The resultant materials moreover have good handling properties, and can effectively scavenge oxygen not only under ambient conditions (from 20° C. to 30° C.) but also under refrigeration conditions (from less than 20° C. to −20° C.).

The walls of the composite-material packaging according to the invention comprise individual, or multiple, layers of materials. The polydienes used according to the invention having terminal epoxy groups can be used as the single polymeric material from which one or more layers of a film is/are formed (and the film can therefore be a multilayer film which by way of example has a gas-barrier layer, a sealable layer, and also other layers for various application sectors, as is known to persons skilled in the art), they can be mixed with other polymeric means of oxygen scavenging (for example poly(octenylenene), conventional polybutadiene, poly(ethylene/vinylcyclohexene) or poly(ethylene-methyl acrylate/cyclohexenylmethyl acrylate) copolymer (EMCM), or can be mixed with one or more main polymers which are known to be amenable to use for the production of packaging film materials and can often make the resultant film more flexible and/or easier to process, and which have low oxygen permeability. In one preferred embodiment according to the invention the polydiene having epoxy groups is introduced into a layer which is composed of a main polymer that is oxygen-impermeable.

According to the invention it is likewise possible to include the oxygen-absorbing functionality in the form of a coating comprising the polydiene having epoxy groups within said multilayer structure. It is moreover possible to provide the oxygen-absorbing functionality in an adhesive layer and/or printed decorative layer comprising the polydiene having epoxy groups within the multilayer structure.

The expression "main polymer", these materials also being called dilution polymers, means for the purposes of the present invention any of the polymers into which the polydiene having epoxy groups can be incorporated according to the present invention, for use as constituent in composite materials for packaging applications. Among suitable main polymers are in particular those selected from the group comprising, but not restricted to, polyethylenes, for example low-density polyethylene, very-low-density polyethylene, ultra-low-density polyethylene, high-density polyethylene and linear low-density polyethylene, polyesters, for example polyethylene terephthalate (PET) or poly-ethylene naphthenate (PEN); polyvinyl chloride (PVC); polyvinylidene chloride (PVDC); polycaprolactone polymers and ethylene copolymers, for example ethylene/vinyl acetate copolymers (EVA and VAE), ethylene/alkyl (meth) acrylate copolymers (EMA), ethylene/vinyl alcohol copolymers (EVOH), poly(vinyl alcohol) (PVOH), ethylene/(meth)acrylic acid copolymers, ethylene/butyl acrylate (EBA) copolymers, ethylene/vinyl alcohol, ethylene/acrylic acid (EAA), polylactide, ionomers and polyamides, for example polycaprolactam (nylon-6), metaxylyleneadipamide (MXD6), hexamethyleneadipamide (nylon-6,6), and also various amide copolymers. It is also possible to use mixtures of various main polymers. It is particularly preferable to use poly(ethylene/vinyl alcohol) (EVOH), poly(vinyl alcohol) (PVOH), polyethylene terephthalate (PET), and polyamides, for example polycaprolactam (nylon-6), metaxylyleneadipamide (MXD6), hexamethyleneadipamide (nylon-66) and various amide copolymers as polymer matrix or as main polymer.

The polydienes used according to the invention with terminal epoxy groups can also be used in non-integral components of said packaging, for example coatings, sachets, bottle closure lining, adhesive or non-adhesive layer-type inserts, lamination adhesives, coupons, gaskets, sealing means, or fiber mat inserts. The abovementioned dilution polymers are generally semicrystalline materials. The selection of a specific dilution polymer(s) depends in essence on the article to be manufactured and the final use of same. Persons skilled in the art are by way of example aware that certain polymers give the resultant article clarity, clean appearance, barrier properties, mechanical properties and/or texture.

In one embodiment of the present invention, the polydiene having terminal epoxy groups can be present in combination with other means of oxygen scavenging. It is possible here that the other means of oxygen scavenging and the polydiene having terminal epoxy groups are present in the same layer. As an alternative it is also possible that the other means of oxygen scavenging are constituents of a layer differing from the layer comprising the polydiene having terminal epoxy groups. Suitable means of oxygen scavenging have already been mentioned, those particularly suitable being poly(octenylenes), conventional polybutadienes, poly(ethylene/vinylcyclohexenes) and poly(ethylene-methyl acrylate/cyclohexenylmethyl acrylate) copolymers (EMCM).

One or more known antioxidants can be introduced into the abovementioned materials in order to retard the degradation of the components during the compounding and film-formation process. Among the suitable antioxidants are by way of example 2,6-di(tert-butyl)-4-methylphenol (BHT), 2,21-methylenebis(6-tert-butyl-p-cresol), triphenyl phosphite, tris(nonylphenyl) phosphite, dilauryl thiodipropionate, vitamin E (alpha-tocopherol), octadecyl 3,5-di-tert-butyl-4-hydroxyhydrocinnamate, tetrakis[methylene(3, 5-di-tert-butyl-4-hydroxyhydrocinnamate)]methane and tetrakis(2,4-di-tert-butylphenyl) 4,4'-biphenyldiphosphonite, but without any restriction thereto.

If an antioxidant is included as part of the container according to the invention, the quantity present thereof can be one that prevents the oxidation of the components of the oxygen scavenger composition, and also of other materials present in the resultant mixture, during production and processing; however, the quantity is advantageously below that which adversely affects the scavenging activity of the resultant layer, of the resultant film, or of the article. The quantity required in any given composition can depend on the components present therein, on the specific antioxidant used, and on the qualitative and quantitative nature of thermal processing used for the production of the molded article. The quantity used of this antioxidant/these antioxidants is typically from 0.01 to 1% by weight.

Other additives that can also be included in the packaging according to the invention are fillers, pigments, colorants, processing aids, plasticizers, antifogging agents and antiblocking agents, without any restriction thereto.

The quantities of the components used in the packaging according to the invention can influence the use and effectiveness of said composition. The quantities of the following used can vary, depending on the desired article and the final use thereof: polydiene having terminal epoxy groups used according to the invention, antioxidant, polymeric diluents, and other known additives. One of the main functions of the polydiene used according to the invention having terminal epoxy groups consists by way of example in that it reacts irreversibly with oxygen during the scavenging process. The quantity of polymer present therefore has a substantial influence on the oxygen scavenging capacity of the composition, i.e. the quantity of oxygen that the composition can absorb. The polydienes used according to the invention having terminal epoxy groups can provide oxygen scavenging properties with a desired rate and capacity, while they have good processing properties and compatibility properties. The polydienes used according to the invention having terminal epoxy groups can therefore be used as they stand or in the form of mixture with film-forming dilution polymers, for example polyolefins, in order to provide a packaging material which is easy to produce and process.

The present packaging according to the invention further reduces the oxygen concentration in a packaging cavity without substantially altering the color, taste and/or odor of the product present therein.

The quantity of the polydienes having terminal epoxy groups present in the packaging must be determined with reference to the final use of the article, and can be in the range from 1 to 100% by weight, for example from 5 to 97.5%, from 10 to 95%, from 15 to 92.5% or from 20 to 90%, of the packaging or of the layer produced therefrom. Incorporation of low contents of the present polydienes having terminal epoxy groups, e.g. from 0.1 to 15% by weight, can be used for active barrier applications, in order to prevent ingress of oxygen into the container. Headroom oxygen scavenging applications requiring removal of large quantities of oxygen from the pack can use higher contents of polydienes having terminal epoxy groups, e.g. from 21 to 100% by weight.

The polydienes having terminal epoxy groups can, as stated previously, be used for the production of a single-layer scavenger film, or of a scavenger layer of a multilayer film, and of other articles for a wide variety of packaging applications. Single-layer articles can easily be produced through extrusion processing, and provide a product with good tack properties. Said properties provide, as previously mentioned, improved processability in the formation of a defect-free film and of similar packaging articles, and moreover in the event of processing as part of the finished packaging article. Multilayer films are typically produced with use of coextrusion, coating, lamination or extrusion/lamination, as taught by way of example in U.S. Pat. Nos. 5,350,622 and 5,529,833.

At least one of the additional layers of a multilayer article can include a barrier-type material. Polymers usually used as passive oxygen barrier layer include polyethylenes, for example low-density polyethylene, very low-density polyethylene, ultra-low-density polyethylene, high-density polyethylene and linear low-density polyethylene, polyesters, for example polyethylene terephthalate (PET) or polyethylene naphthenate (PEN); polyvinyl chloride (PVC); polyvinylidene chloride (PVDC); polycaprolactone polymers and ethylene copolymers, for example ethylene/vinyl acetate copolymers (EVA and VAE), ethylene/alkyl (meth)acrylate copolymers (EMA), ethylene/vinyl alcohol copolymers (EVOH), poly(vinyl alcohol) (PVOH), ethylene/(meth) acrylic acid copolymers, ethylene/butyl acrylate (EBA) copolymers, ethylene/vinyl alcohol, ethylene/acrylic acid (EAA), polylactide, ionomers and polyamides, for example polycaprolactam (nylon-6), metaxylyleneadipamide (MXD6), hexamethyleneadipamide (nylon-6,6), and also various amide copolymers. It is also possible to use mixtures of different main polymers. Particular preference is given to use of the following as polymer matrix or as main polymer: poly(ethylene/vinyl alcohol) (EVOH), poly(vinyl alcohol) (PVOH), polyethylene terephthalate (PET), and polyamides, for example polycaprolactam (nylon-6), metaxylyleneadipamide (MXD6), hexamethyleneadipamide (nylon-6,6) and various amide copolymers.

Other additional layers can include one or more layers that are oxygen-permeable. In one embodiment, for example flexible food packaging, the layers can include (in the sequence starting from the external side of the packaging and extending to the innermost layer of the packaging):

(a) a passive oxygen barrier layer, (b) a scavenger layer, i.e. a layer which comprises the polydienes described here having terminal epoxy groups, and optionally (c) an oxygen-permeable layer.

Control of the oxygen barrier layer of layer (a) provides a means for the regulation of the scavenger activity time of the pack, in that the rate of oxygen ingress into the scavenger layer (b) is restricted, and the rate of consumption of scavenger capacity is thus restricted. Control of the oxygen permeability of layer (c) provides a means of setting, irrespective of the composition of the scavenger layer (b), an upper limit to the rate of oxygen scavenging effect for the entire structure. This can be useful for the purpose of prolonging the handling lifetime of the film in the presence of air before the pack is sealed. Layer (c) can moreover provide a barrier to migration of the individual components or by-products of the scavenger layer into the interior of the packaging. The expression "exposed to the interior" refers to a part of a packaging article with the present polydienes having terminal epoxy groups which has exposure, either directly or indirectly (by way of layers that are $O_2$-permeable) to the interior cavity with the oxygen-sensitive product. Layer (c) can moreover improve the heat-sealability, clarity and/or resistance to blocking of the multilayer film. It is also possible to use other additional layers, for example bonding layers, peel layers and sealable layers. Polymers typically used in said bonding layers include by way of example anhydride-functional polyolefins.

Even in the absence of further information it is assumed that a person skilled in the art can make very extensive use of the above description. The preferred embodiments and examples are therefore to be interpreted merely as descriptive disclosure, and certainly not as disclosure that is in any way limiting.

The present invention is explained in more detail below with reference to examples. Alternative embodiments of the present invention are obtainable analogously.

EXAMPLES

Production of polybutadiene having epoxy groups:
Production of the polybutadienes having epoxy groups used Polyvest EP HT (Evonik) and Poly bd R-20LM (Cray Valley).

Polyvest EP HT is synthesized in accordance with the synthesis instructions described in the Patent EP12169794.

Example 1

116.8 g (0.1 mol of OH equivalent) of Polyvest EP HT dissolved in 83.2 g of toluene are used as initial charge together with 0.19 g (0.001 mol) of SnCl2 in a sulphonation flask provided with thermometer, stirrer, reflux condenser, nitrogen blanketing and dropping funnel. 10.18 g (0.11 mol) of epichlorohydrin are added at room temperature, with stirring, to this mixture. The reaction mixture is heated for 5 hours to an internal temperature of 100° C. The mixture is cooled to 50° C. and then within 30 minutes 1.6 g (0.02 mol) of 50% aqueous NaOH solution and 3.6 g (0.09 mol) of pulverized NaOH, in portions, are added. Stirring of this mixture is continued for 1 hour at 50° C. The reaction mixture is filtered. The organic phase is dried over MgSO4 and filtered and isolated in vacuo from the solvent. 112 g (91.5% of theory) of the almost colorless polybutadiene glycidyl ether with an equivalent weight of 1840 are isolated. The viscosity of the product, determined with a rotary viscometer, is 14 Pa s at 20° C. The Tg value determined is −78° C. The microstructure of the polybutadiene used, having hydroxy groups, is retained (22% of 1,2-vinyl, 20% of 1,4-cis, 58% of 1,4-trans).

Example 2

58.4 g (0.1 mol of OH equivalent) of Poly bd R-20LM dissolved in 41.6 g of toluene are used as initial charge together with 0.19 g (0.001 mol) of SnCl2 in a sulphonation flask provided with thermometer, stirrer, reflux condenser, nitrogen blanketing and dropping funnel. 10.18 g (0.11 mol) of epichlorohydrin are added at room temperature, with stirring, to this mixture. The reaction mixture is heated for 5 hours to an internal temperature of 100° C. The mixture is cooled to 50° C. and then within 30 minutes 1.6 g (0.02 mol) of 50% aqueous NaOH solution and 3.6 g (0.09 mol) of pulverized NaOH, in portions, are added. Stirring of this mixture is continued for 1 hour at 50° C. The reaction mixture is filtered. The organic phase is dried over MgSO4, again filtered, and isolated in vacuo from the solvent. 56.3 g (87.9% of theory) of the almost colorless polybutadiene glycidyl ether with an equivalent weight of 1010 are isolated. The viscosity of the product, determined with a rotary viscometer, is 4.2 Pa s at 20° C. The Tg value determined is −71° C. The microstructure of the polybutadiene used, having hydroxy groups, is retained (22% of 1,2-vinyl, 20% of 1,4-cis, 58% of 1,4-trans).
Reactive Extrusion:

Example 3

A Leistritz Micro GL27 twin-screw extruder with screw diameter of 27 mm and length of 40 D was used. The extruder had a vacuum venting system.

The pelletized nylon-6 (Ultramid B27 E from BASF) was introduced into the extruder by way of a nitrogen-blanketed feed. The extrusion process was carried out at 200 rpm, at a temperature of about 260° C. and with an average throughput of 10 kg/h.

The liquid polybutadiene having epoxy groups was injected by a liquid-metering pump directly into the mixing zone of the extruder. The injection rate was adjusted in such a way that the quantity incorporated into the mixture was 2.5, 5.0 and, respectively, 7.5% by weight of polybutadiene having epoxy groups, based on the quantity of nylon-6.

The strand extrudate was cooled in a water bath and was then pelletized.

The reactive incorporation of the polybutadiene having epoxy groups into the nylon-6 matrix could be followed by using gel permeation chromatography (GPC). To this end, the compounded materials were in each case dissolved at a concentration of c=5 g/L in hexafluoroisopropanol+0.05 mol of potassium trifluoroacetate at room temperature.

Ethylbenzene was used as external standard. A PFG column combination (a) 30 cm, 7 μm, 1000 Å; b) 30 cm, 7 μm, 300 Å; c) 30 cm, 7 μm, 100 Å) was used as stationary phase for the gel permeation chromatography. A combination of refractive index and UV at 256 nm was used for detection. The average molar masses stated in Table 1 are based on calibration with a polymethyl methacrylate standard.

TABLE 1

| Compound | Proportion of polybutadiene having epoxy groups | Proportion of polyamides | Relative average molar mass Mw (g/mol) |
|---|---|---|---|
| 1 | 0 | 100 | 63 300 |
| 2 | 2.5 | 97.5 | 71 400 |
| 3 | 5.0 | 95.0 | 73 500 |
| 4 | 7.5 | 92.5 | 79 400 |

The average molar mass (Mw) rises as the proportion of epoxy-terminated polybutadiene used in the reactive extrusion process increases. The GPC elution plots moreover show no signal relating to epoxy-terminated polybutadiene not bonded into the material. On the basis of these analytical results, it can be assumed that reactive bonding of the epoxy-modified polybutadiene into the PA 6 matrix is complete.

Example 4

A Leistritz Micro GL27 twin-screw extruder with screw diameter of 27 mm and length of 40 D was used. The extruder had a vacuum venting system.

The pelletized EVOH (EVAL-F 101B from Kuraray) was introduced into the extruder by way of a nitrogen-blanketed feed. The extruder was operated at 200 rpm, at a temperature of about 220° C. and with an average throughput of from 10-20 kg/h.

The liquid polybutadiene having epoxy groups was injected by a liquid-metering pump directly into the first mixing zone of the extruder. The injection rate was adjusted in such a way that the quantity incorporated into the mixture was 2.5, 5.0 and, respectively, 7.5% by weight of polybutadiene having epoxy groups, based on the EVOH.

The extrudate was cooled in a water bath and was then pelletized.

Example 5

A Leistritz Micro GL27 twin-screw extruder with screw diameter of 27 mm and length of 40 D was used. The extruder had a vacuum venting system.

The pelletized PET (Lighter C93 from Equipolymers) was introduced into the extruder by way of a nitrogen-blanketed feed. The extruder was operated at 200 rpm, at a temperature of about 270° C. and with an average throughput of 10 kg/h.

The liquid polybutadiene having epoxy groups was injected by a pump directly into the mixing zone of the extruder. The injection rate was adjusted in such a way that the quantity incorporated into the mixture was 2.5, 5.0 and, respectively, 7.5% by weight of polybutadiene having epoxy groups, based on the quantity of PET.

The strand extrudate was cooled in a water bath and was then pelletized. The pellets were stored under a blanket of nitrogen.

Production of Single- and Multilayer Films:

A seven-layer coextrusion plant was used for the production of single- and multilayer films based on the compounded materials described in Examples 3-6. Film thickness is monitored in-line by a capacitive sensor. The screw diameter of the main extruder is 30 mm, with a screw length of 30 D. Two coextruders have a screw diameter of 20 mm with a screw length of 25 D, and the third coextruder has a screw diameter of 25 mm with a screw length of 25 D. The die is 300 mm wide, giving a maximum film width of about 250 mm. The extrusion components are followed by a coolable/heatable chill roll/polishing stack unit with edge trim and winding unit. The maximum take-off speed is 16 m/min, and the film thicknesses are variable from about 0.02 mm to about 1.5 mm.

Example 6

Production of Nylon-6-Based Single-layer Films:

This example describes the production of a single-layer film from the nylon-6-based compounded material (see Example 3). Before the extrusion process, finely ground cobalt stearate powder was admixed with the pelletized compounded material. The quantity of admixed cobalt stearate was 0.25% by weight.

The mixture was introduced into the extrusion plant in a nitrogen-blanketed feed. The compounded material was extruded at a temperature of 260° C. and discharged at a die temperature of 280° C. and passed to the chill roll/polishing stack unit. The layer thickness of the single-layer film was adjusted to 100 μm. The films were stored under a blanket of nitrogen.

Example 7

Production of PET-Based Single-layer Films:

This example describes the production of a single-layer film from the PET-based compounded material (see Example 5). Before the extrusion process, finely ground cobalt stearate powder was admixed with the pelletized compounded material. The quantity of admixed cobalt stearate was 0.5% by weight.

The mixture was introduced into the extrusion plant in a nitrogen-blanketed feed. The compounded material was extruded at a temperature of 240° C. and discharged at a die temperature of 260° C. and passed to the chill roll/polishing stack unit. The layer thickness of the single-layer film was adjusted to 250 μm. The films were stored under a blanket of nitrogen.

Example 8

Production of 5-layer Films

This example describes the production of a 5-layer film composed of a layer structure in the following sequence: polyethylene (Moplen HP640J), Admer QF 551 E (Mitsui Chemicals), compounded material composed of EVOH and epoxy-terminated polybutadiene, Admer QF 551 E and polyethylenes. Before the extrusion process, finely ground cobalt stearate powder was admixed to the pelletized compounded EVOH/epoxy-terminated polybutadiene. The quantity of admixed cobalt stearate was 0.5% by weight. The compounded material was introduced into the main extruder in a nitrogen-blanketed feed. The compounded material was extruded at a temperature of 235° C. The polypropylene used as external layer in the layer structure was extruded at 240° C. in a coextruder. The Admer QF 551 E functioning as adhesion promoter was used in the second coextruder at 240° C. The entire strand extrudate was discharged with a die temperature of 245° C. and passed to the chill roll/polishing stack unit. The layer thickness of the 5-layer film was adjusted to give the following layer thicknesses: each of the two polypropylene external layers 25 μm, Admer layer 10 μm and middle layer of compounded material 10 μm. The multilayer films were stored under a blanket of nitrogen.

Oxygen Absorption Study:

The single-layer films produced in Example 6 were studied. The samples were stored in measurement cells. The measurement cells were composed of stainless steel. The internal diameter is 9.1 cm. The internal height is 2.3 cm, giving a headroom volume of 150 $cm^3$. On the external sides there were two opposite stop valves. These permitted gas-flushing of the cell. A glass plate of diameter 12 cm served to seal the measurement cells.

This is pressed onto the cell by the screw-thread operated gasket ring. The cell is thus a closed system.

OXY-4 measurement equipment was used to determine the oxygen partial pressure in the measurement cells. The oxygen partial pressure is measured in accordance with the following principle of dynamic luminescence quenching. The oxygen content in the cell was calculated from this information by using the ideal gas equation. The reduction of oxygen content in the measurement cell corresponds to the quantity of oxygen absorbed. Once the oxygen pressure in the cell reached almost zero millibar, the cell was flushed with synthetic air. The total quantity of oxygen consumed was calculated.

The single-layer films produced in Example 6 were studied.

The temperature at which the measurements were made was 23° C. The headroom in the measurement cell was 150 $cm^3$.

The oxygen partial pressure in the headroom was recorded as a function of time and converted to mg of $O_2$/g of film. Single-layer films with a layer thickness of 100 μm were studied.

TABLE 2

O₂ absorption of PA-6-based compounded materials with epoxy-terminated polybutadiene:

| PB having epoxy groups/% by weight | Co stearate [ppm] | O₂ absorption after 50 days [mg of O₂/g of film] | O₂ absorption after 50 days [mg of O₂/g of polybutadiene] | O₂ absorption after 150 days [mg of O₂/g of film] | O₂ absorption after 150 days [mg of O₂/g of polybutadiene] |
|---|---|---|---|---|---|
| 0 | 2500 | <0.5 | — | <0.5 | — |
| 5.0 | 0 | 3 | 60 | 6.0 | 120 |
| 2.5 | 2500 | 3.5 | 140 | 5.0 | 210 |
| 5.0 | 2500 | 4.0 | 80 | 7.5 | 150 |
| 7.5 | 2500 | 8.0 | 110 | 13.0 | 170 |

The oxygen absorption of the single-layer films after 150 days of measurement time was in the range from 5.0 to 13.0 mg of oxygen/g of film, depending on the concentration of epoxy-terminated polybutadiene reactively bonded into the material.

The invention claimed is:

1. A composite material for packaging applications, the composite material comprising an oxygen scavenger comprising a polydiene comprising terminal epoxy groups wherein the epoxy-terminated polydiene is polybutadiene having epoxy groups, wherein the polybutadiene comprises the 1,3-butadiene-derived monomer units

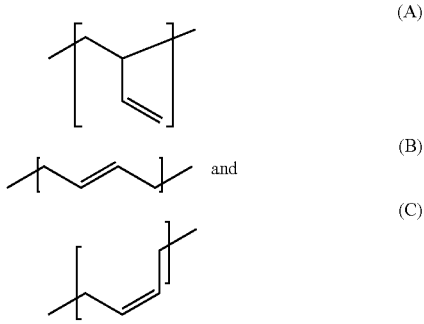

wherein the proportion of A in the entirety of the 1,3-butadiene-derived monomer units present in the polybutadiene is from 15 to 30 mol percent,
wherein the proportion of B in the entirety of the 1,3-butadiene derived monomer units present in the polybutadiene is from 50 to 70 mol percent and the proportion of C in the entirety of the 1,3-butadiene-derived monomer units present in the polybutadiene is from 15 to 30 mol percent, and
wherein the epoxy groups comprise the formula (I)

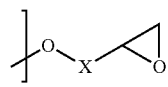

wherein X is a linear alkylene group of the formula —(CH₂)ₓ—, where x is from 1 to 4,
and wherein the polybutadiene comprises an average of 1.5 to 3 epoxy groups, and wherein the composite material comprises of at least two layers including a nylon-6-based single layer film comprising the oxygen scavenger has an oxygen absorption of from 5.0 to 13.0 mg of oxygen/g of the nylon-6-based single layer film.

2. A coating comprising the composite material according to claim 1.

3. The composite material according to claim 1, wherein the at least two layers differ from one another.

4. The composite material according to claim 1, wherein the composite material takes the form of flexible film layers, flexible pouches, self-supporting containers or combinations thereof.

5. The composite material according to claim 1, wherein the composite material comprises layers, and wherein the polydienes comprising terminal epoxy groups are used in one, some or all of the layers of the composite material.

6. The composite material according to claim 1, wherein the polydiene comprising epoxy groups is introduced into a layer which is composed of a main polymer that is oxygen-impermeable.

7. The composite material according to claim 6, wherein the main polymer is selected from the group consisting of polyethylenes, polyester, polyvinyl chloride (PVC); polyvinylidene chloride (PVDC); polycaprolactone polymers and ethylene copolymers, poly(vinyl alcohol) (PVOH), ionomers, polyamides and amide copolymers.

8. The composite material according to claim 1, wherein the polydiene comprising terminal epoxy groups is present in combination with other means of oxygen scavenging.

9. The composite material according to claim 8, wherein the other means of oxygen scavenging and the polydiene comprising terminal epoxy groups are present in one layer.

10. The composite material according to claim 8, wherein the other means of oxygen scavenging are constituents of a layer differing from the layer comprising the polydiene comprising terminal epoxy groups.

11. The composite material according to claim 1, wherein the polybutadiene comprises an average of 1.75 to 2.5 epoxy groups.

12. The composite material according to claim 1, wherein the X is a linear alkylene group of the formula —(CH₂)ₓ—, where x is 1.

13. A composite-material packaging at least comprising a polydiene comprising terminal epoxy groups wherein the epoxy-terminated polydiene is polybutadiene having epoxy groups, wherein the polybutadiene comprises the 1,3-butadiene-derived monomer units

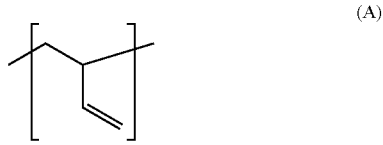

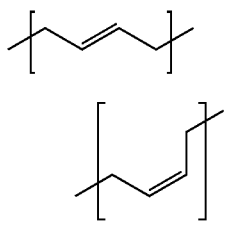

wherein the proportion of A in the entirety of the 1,3-butadiene derived monomer units present in the polybutadiene is from 15 to 30 mol percent, and wherein the proportion of B in the entirety of the 1,3-butadiene derived monomer units present in the polybutadiene is from 50 to 70 mol percent and the proportion of C in the entirety of the 1,3-butadiene-derived monomer units present in the polybutadiene is from 15 to 30 mol percent, and wherein the epoxy groups have the formula (I)

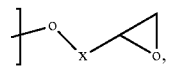

wherein X is a linear alkylene group of the formula —$(CH_2)_x$—, where x is from 1 to 4,
and wherein the polybutadiene comprises an average of 1.5 to 3 epoxy groups, and a nylon-6-based single layer film comprising the oxygen scavenger has an oxygen absorption of from 5.0 to 13.0 mg of oxygen/g of the nylon-6-based single layer film.

14. The composite-material packaging according to claim 13, wherein the X is a linear alkylene group of the formula —$(CH_2)_x$—, where x is from 1 to 4.

15. The composite-material packaging according to claim 13, wherein the X is a linear alkylene group of the formula —$(CH_2)_x$—, where x is 1.

* * * * *